R. E. WALTHER.
BALL BEARING FOR SPINNING MACHINE SPINDLES.
APPLICATION FILED OCT. 25, 1912.
1,080,393. Patented Dec. 2, 1913.
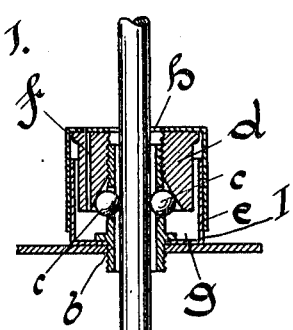
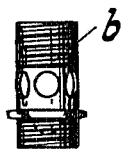
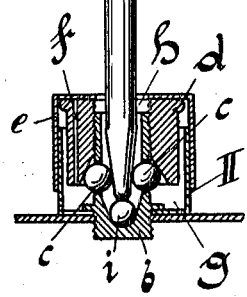
Witnesses:
Inventor:
Robert Emil Walther

UNITED STATES PATENT OFFICE.

ROBERT EMIL WALTHER, OF WERDAU, GERMANY.

BALL-BEARING FOR SPINNING-MACHINE SPINDLES.

1,080,393.  Specification of Letters Patent.  Patented Dec. 2, 1913.

Application filed October 25, 1912.  Serial No. 727,757.

*To all whom it may concern:*

Be it known that I, ROBERT EMIL WALTHER, a subject of the German Emperor, residing at Werdau, Saxony, Germany, have invented a certain Improved Ball-Bearing for Spinning-Machine Spindles, of which the following is a specification.

The present invention relates to ball-bearings for the spindles of spinning machines and the like, and consists in the provision, for the neck- as well as for the step-bearing, of a rigid sleeve constructed as a ball cage, and of a socket which is screwed upon the sleeve so as to hold steel-balls, fitted in the cage, against the spindle, the socket having a conical bearing surface for the balls so that the latter can be adjusted relative to the spindle by a turning of the socket on its screw thread.

In the accompanying drawings the invention is illustrated, Figure 1 representing a side view of the spindle with its bearings, the latter being shown in section, and Fig. 2, an elevation of the lower ball-cage.

The neck-bearing is designated I and the step-bearing II. Both are composed of a rigid sleeve $b$ in which apertures are made for the reception of steel balls $c$ which bear against and support the spindle $a$, the diameter of the latter being smaller than the internal diameter of the sleeve. On the outside of the sleeve a socket $d$ is screwed, which socket has a conical surface with which to bear against the balls $c$ for holding them in position. An adjustment of the socket $d$ on its screw-thread adjusts the balls $c$ relative to the spindle $a$ which can thus be held steadily in its proper position while turning freely between the balls. In the step-bearing II the sleeve $b$ is closed at its lower end and fitted with an additional ball $i$ adapted to take the thrust of the spindle. The bearings are in both instances inclosed in a box $g$ over which is pushed a cover $e$. The latter has an aperture $h$ to admit the spindle and another aperture through which and through a duct $f$ in the socket $d$, oil can be fed into the box $g$. The box $g$ and the cover $e$ protect the bearing from dust.

I claim:

1. An adjustable ball-bearing for spinning machine spindles, comprising a rigid sleeve, balls held in apertures in said sleeve so as to bear against the spindle, and a socket screwed on the outside of the sleeve and adapted to hold the balls in position, said socket having a conical surface with which it bears against the balls so that the latter can be adjusted when the socket is turned on its screw-thread.

2. An adjustable ball-bearing for spinning machine spindles, comprising a rigid sleeve, balls held in apertures in said sleeve so as to bear against the spindle, a socket screwed on the outside of the sleeve for holding the balls in position and adjusting them relative to the spindle, a box surrounding the sleeve and the socket, and a cover adapted to be pushed over the box so as to protect the bearing from dust.

ROBERT EMIL WALTHER.

Witnesses:
  SIDNEY RICH,
  M. J. BENNDORF.